Figure 5:
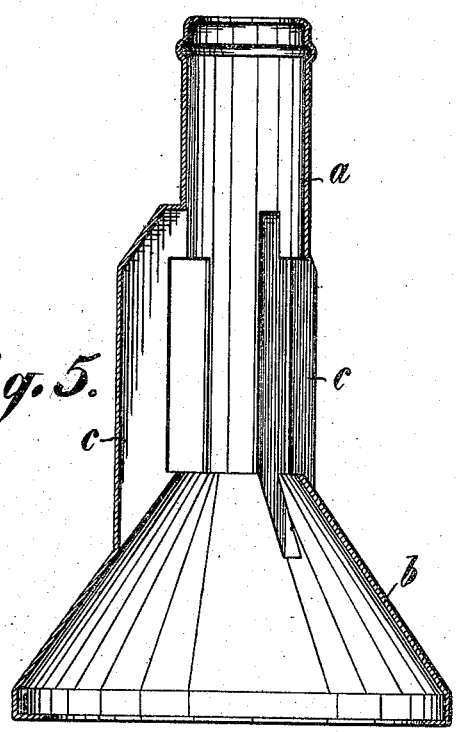

No. 867,097. PATENTED SEPT. 24, 1907.
C. BERGNER.
MILK SEPARATOR.
APPLICATION FILED AUG. 7, 1905.
3 SHEETS—SHEET 1.
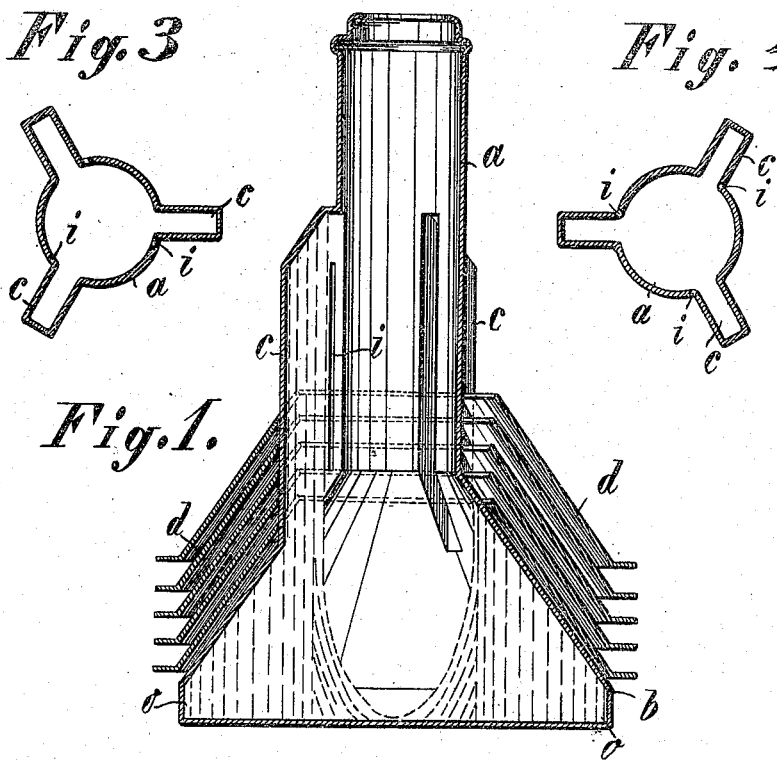
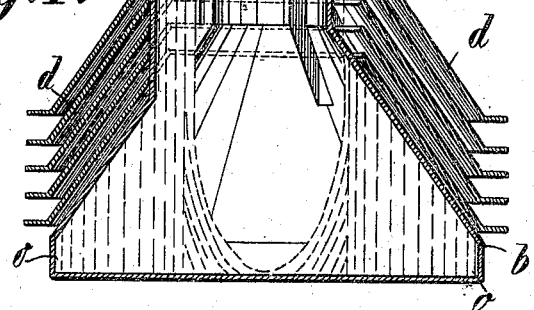
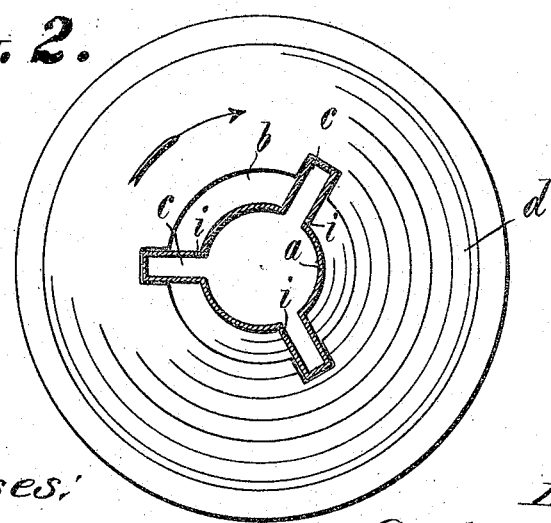
Witnesses:
Inventor
Carl Bergner No. 867,097. PATENTED SEPT. 24, 1907.
C. BERGNER.
MILK SEPARATOR.
APPLICATION FILED AUG. 7, 1905.

3 SHEETS—SHEET 2.

Witnesses:
Dennis Sumby
C. D. Kesler

Inventor
Carl Bergner
By James L. Norris

No. 867,097. PATENTED SEPT. 24, 1907.
C. BERGNER.
MILK SEPARATOR.
APPLICATION FILED AUG. 7, 1905.
3 SHEETS—SHEET 3.
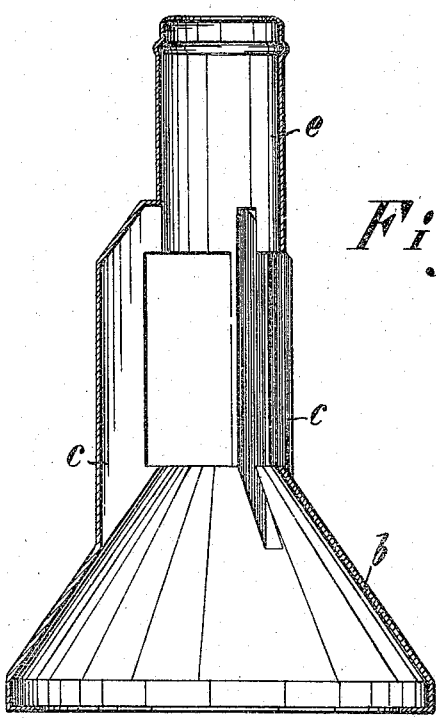
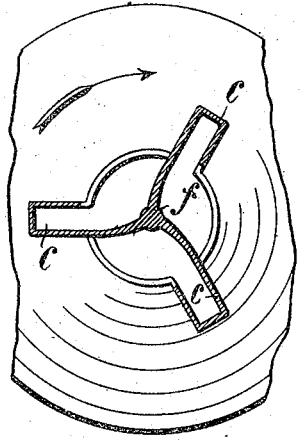
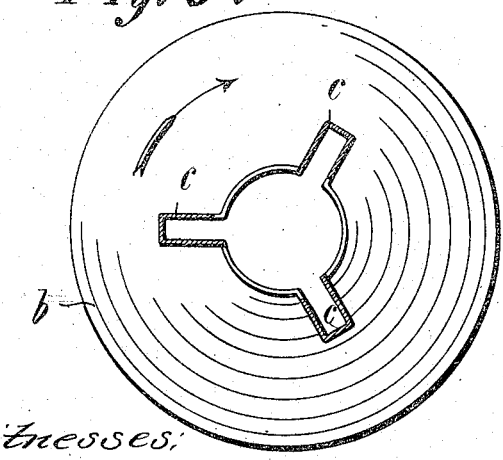
Witnesses:
Inventor
Carl Bergner

UNITED STATES PATENT OFFICE.

CARL BERGNER, OF SANDE, NEAR BERGEDORF, GERMANY.

MILK-SEPARATOR.

No. 867,097.  Specification of Letters Patent.  Patented Sept. 24, 1907.

Application filed August 7, 1905. Serial No. 273,136.

*To all whom it may concern:*

Be it known that I, CARL BERGNER, director of the Bergedorfer Eisenwerk, of Sande, near Bergedorf, near Hamburg, in the German Empire, have invented new and useful Improvements in and Relating to Milk-Separators and Similar Apparatus, of which the following is a clear and distinct description.

In the case of all the older devices for introducing new milk into separator drums provided with conical plates no provision has originally been made for forcing the new milk to pass through the space between the different plates. Consequently the milk was not distributed in a uniform manner, the greater part, if not all of it, flowing only into the lower plates.

Various remedies have been proposed to overcome this defect. It has been proposed, for instance to cause the milk to flow out only from a certain limited part of the central inlet pipe by providing the pipe, or chambers laterally extending therefrom, with longitudinal slits, or by narrowing the central inlet pipe. In the case of pipes where the outlet slits were situated in the laterally extending chambers, the arrangement was at the same time intended to cause the new milk to flow in a compact mass through the girdle of cream which had formed around the inlet pipe, and thus to prevent it from interfering with the cream. None of these devices, however, effect a really satisfactory uniform distribution of the milk between the various plates, while some even complicate the construction of the drum to such an extent as, on the one hand to increase considerably the cost of the apparatus and, on the other, to render it difficult to clear the pipe.

In the apparatus, to which this invention relates, chambers extending laterally from the circumference of the central inlet pipe, and closed towards the outside, are provided, and the milk is caused to flow, not into the central zone, but in the space lying within the creamzone towards the middle and being free from liquid.

If a central inlet pipe is employed at all, it is best to place the outlet slits in one of the walls of the laterally extending chambers, or at the angle formed by the wall of the chamber and the wall of the pipe. If situated in one of the walls of the chamber, the slits should be placed in that one which is in front according to the direction of rotation of the apparatus. By placing the slits in the comparatively thin walls of the chambers, or of the central inlet pipe close to the base of the chamber, it becomes possible to make the slits very narrow and to construct them in a very simple manner. At the same time it is rendered impossible for an unduly large quantity of milk to flow into the lower part of the apparatus, as the milk which passes through the central inlet pipe, settles vertically in the hollow laterally extending chambers and passes, as soon as its level is in the same plane as the slit arranged at the lower end of the laterally extending chamber over the outer edge of this slit and, flowing along the outer surface of the front of the chamber, into the neutral zone, that is to say, into the space where the separation of the milk into skimmed milk and cream is about to be effected. Interference with the cream already separated cannot take place, as no cream accumulates on the external surface of the front of the chamber, on the contrary that place will be kept free from liquid. This phenomenon is due to the fact that the particles of cream which coming from the circumferential zones, are forced towards the middle posses a greater velocity in the direction of rotation than the planes towards which they are urged, consequently they travel quicker than the central pipe and the laterally extending chambers and move in a paraboloid from the outside towards the inside, that is they move forward in a curve around the laterally extending chambers.

Devices are also known in which for the purpose of damming the milk and to cause it to adjust itself so as to form a cylindrical figure within the central inlet pipe, longitudinal chambers have been provided within the central pipe and the milk has been caused to flow out through longitudinal slits arranged in the pipe between the inner chambers. If this arrangement is adopted the new milk passes out not through a slit in the walls of the chamber but through a slit arranged in the central inlet pipe. It is obvious that such a device cannot insure a uniform distribution of the milk.

To enable a larger quantity of milk to pass through the upper portion of the slit, should it appear desirable to do so, it is only necessary in apparatus of the kind to which this invention refers so to arrange the slit that it runs obliquely, that is, that its upper end is situated somewhat more towards the outside than its lower end, instead of placing it vertically, that is parallel to the axis of the pipe.

The accompanying drawings show three different examples of constructing apparatus in accordance with this invention and in which—

Figure 6:
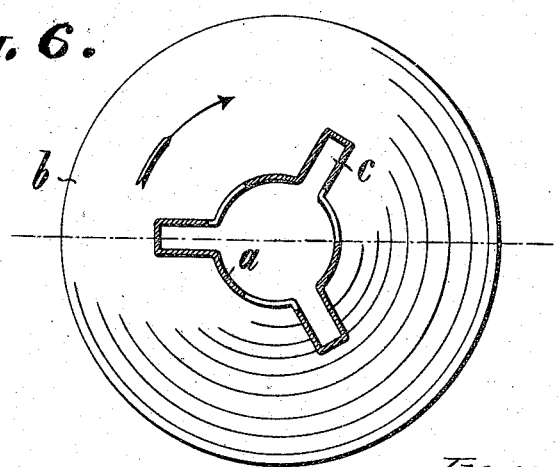

Figure 1 is a longitudinal and transverse section of the inlet pipe; Fig. 2 is a sectional plan; Figs. 3 and 4 are horizontal sections; Fig. 5 is a longitudinal and transverse section of a modification; Fig. 6 is a sectional plan thereof; Fig. 7 is a view similar to Fig. 5 of a modification; Fig. 8 is a sectional plan, and Fig. 9 is a view similar to Fig. 8.

Referring to Figs. 1, 2, 3 and 4 of the drawings, *a* denotes an inlet pipe mounted in the usual manner upon a sediment collector *b*. The pipe is provided with laterally projecting chambers *c* which open into the central pipe *a* and engage for the purpose of holding plates *d* with recesses provided therein as shown in Fig. 2. In the horizontal section shown in Fig. 2 the slit *i* by means of which the new milk passes from the chamber *c* into the drum is arranged at the bottom of the laterally extending chamber in that wall of the chamber which forms its front in accordance with the direction of rotation. In the section shown in Fig. 3 the slit $i$ is situated exactly at the angle formed by the walls of the chamber and of the pipe, while in the section shown in Fig. 4 it is situated in the wall of the central pipe close to the base of the chamber $c$. The mode of operation is clearly visible from the vertical section shown in Fig. 1. The new milk, after entering the apparatus by means of the central inlet pipe, sinks to the bottom of the sediment; collector $b$, is forced by centrifugal force into the corners $o$ and assumes the figure of a paraboloid. Consequent on the supply of fresh milk to the apparatus and the large number of revolutions, the surface of the milk in the apparatus becomes more and more vertically, that is to say, more nearly parallel with the axis of the drum. The milk finally assumes the position shown in Fig. 1 the cylinder growing gradually towards the interior, that is, in the direction of the axis, of the drum until the inner surface of the milk becomes level with the peripheral entrance of the laterally projecting chambers. If more milk is supplied to the apparatus the chambers $c$ will likewise become full until the surface of the milk will be in the same place as the slit $i$. As the surface of the milk has as already stated, by now become nearly vertical, that is, nearly parallel with the slit $i$, it must flow uniformly over the edge of the slit along its entire length if more milk is supplied to the apparatus. The milk, after passing through the slit, flows along the exterior surface of that slit of the chamber which according to the direction of rotation forms its front, and passes beyond the inner rim of the plate $d$, into the neutral zone, that is to say, into that part of the drum where the milk is about to be separated and, consequently is still of nearly the same specific gravity as the new milk entering the neutral zone.

The method of operating the example of apparatus in accordance with the invention shown in Figs. 5 and 6 is exactly the same as that of operating the apparatus just described, the difference between the two being entirely structural. Fig. 5 shows that the greater part of the circumference of the central inlet pipe is provided with aperture of such a character as to leave solid only a small part of the pipe $a$ adjacent to that part of the laterally projecting chamber which is opposite to the direction of rotation. The milk flows in this case also over the peripheral edge of the open side of the laterally extending chamber, and fills the laterally extending chamber in the same manner, as in the case of the apparatus already described, whereupon it flows over the edge of the slit, that is to say of the aperture. As the milk passes only over the edge of the slit, the size of the aperture itself is of no consequence.

The example of apparatus illustrated in Figs. 7 and 8, is a further modification of the example of apparatus according to Fig. 5. In this instance even the parts of the pipe $a$ retained in that apparatus being dispensed with and nothing being retained but some hollow columns within the drum which take the place of the laterally extending chambers of the apparatus already described. As the central pipe, as already has been stated, does not take any part in distributing the milk it may, of course be entirely omitted, without altering the character of the process. The hollow grooves or columns $c$ which are mounted vertically upon the sediment collector $b$ are kept in position relatively to each other by means of a ring or the like, or as shown in Fig. 9 by means of a shaft $f$ with radially extending vanes. The last mentioned form of construction is best adapted for centrifugal separators operated by hand, that is apparatus of no great height and without sediment collectors, in which the distribution of the milk takes place directly from above. The milk flows directly from above into the hollow columns, filling them gradually. To enable the milk to flow over the front of the column, that is over the side which is in front according to the direction of rotation, it is necessary for the front of the hollow column to be narrower than its rear.

Having now particularly described and ascertained the nature of my said invention and in what manner the same is to be performed I declare that what I claim is:

A milk separator comprising in combination with a sediment collector, of a series of hollow columns extending vertically from said collector, and a member provided with radially extending vanes for connecting the columns to each other, the front of said columns being shorter than the rear thereof.

In testimony whereof I have hereunto set my hand in presence of two subscribing witnesses.

CARL BERGNER.

Witnesses:
OTTO W. HELLMRICH,
IDA CHRIST. HAFERMANN.